United States Patent Office.

THOMAS RYAN, JR., OF FLINT, AND NEWTON HUGHES, OF BAGILLT, ENGLAND, ASSIGNORS TO THE UNITED ALKALI COMPANY, LIMITED, OF LIVERPOOL, ENGLAND.

PROCESS OF EXTRACTING ZINC FROM SUBSTANCES CONTAINING SAME.

SPECIFICATION forming part of Letters Patent No. 647,989, dated April 24, 1900.

Application filed December 26, 1899. Serial No. 741,656. (No specimens.)

*To all whom it may concern:*

Be it known that we, THOMAS RYAN, Jr., residing at Castle Hill House, Flint, and NEWTON HUGHES, residing at Bedol, Bagillt, in the county of Flint, England, subjects of the Queen of Great Britain, have invented new and useful Improvements in Processes of Extracting Zinc from Substances Containing the Same, of which the following is a specification.

Our invention has for its object an improved process for extracting zinc from substances containing the same.

According to our process the zinc is finally isolated in the form of zinc oxid or zinc hydroxid, and the further treatment or utilization of this product may vary according to circumstances.

An important result in the carrying out of our process lies in the fact that nearly all the reagents employed may be recovered in a valuable commercial form.

Among the substances which contain zinc and which may be treated economically by our process we mention the following as examples—viz., zinc-fume, furnace gases or flue-dust containing zinc, zinc dust or scrap, zinc "seconds," calcined blend, galvanized scrap or waste, battery liquor containing zinc, and zinc ores.

The substance about to be treated according to our process is first washed, leached, or lixiviated with a solution of a caustic alkali. We use in practice caustic soda. This treatment is preferably carried out in a series of vessels or vats, and the liquid enters the series in rotation, a fresh supply of liquid following on step by step. The liquid is commingled with the substance being treated, and agitation and artificial heat may be employed to make the dissolving action rapid and thorough. It will be seen from the foregoing that the liquid in its passage through the vats encounters a fresh supply of raw material at each vat, while the partly-denuded raw material is as often attacked by fresh liquid. The number of vats and the time during which the treatment is continued will vary according to the raw material. We find in practice that for the treatment of spiegeleisen flue-dust, five vats are sufficient to remove all but a very small trace of zinc, while the caustic liquor is practically saturated with zinc. We term this the "zincate liquor." The zincate liquor on leaving the vats is treated to separate from it any lead that is held in solution by running it through a vessel containing scrap-zinc and scrap-iron, or scrap galvanized iron may be employed. A galvanic action is set up, and the lead is thereby thrown down as a metallic precipitate. In some cases an independent supply of electric current may be provided from extraneous sources in a well-known manner, the object in either case being to throw down the lead. After being deplumbated the liquor is heated and agitated with caustic lime, which has the effect of "fining" or clarifying it, and this action may be aided by blowing through it atmospheric air. If a very pure product is desired, the liquor may be still further fined by the addition of bleaching-powder. The treatment with lime and with bleaching-powder causes an insoluble precipitate, partly composed of organic matters and partly of oxids of iron, manganese, or silicon, should such bases be present in the raw material. This deposit is removed by decantation or filtration, and the clarified zincate liquor is finally treated with either carbonic acid or acetic acid. The reason that we have for employing carbonic or acetic acid is that the resulting by-products—viz., carbonate or acetate of soda—are commercially valuable. Other acids, such as sulfuric or hydrochloric, might be used to decaustify the solution and throw down the zinc oxids, but the resulting by-products would be comparatively worthless. In either case the result is that the zinc is precipitated in the form of zinc oxid or zinc hydroxid. If we use carbonic acid, the liquid remaining contains carbonate of soda, and if acetic acid is used the liquid contains acetate of soda in solution. It is not material to this invention which reagent is employed to effect this final precipitation.

The oxid or hydroxid is separated from the liquor by well-known means, such as decantation, or a filter-press or centrifugal machine may be employed. Washing with water to remove adhering soluble matter and drying complete the product. After the zinc is removed the carbonate of soda or acetate of soda, as the case may be, is recovered in a well-known manner; or, if preferred, when carbonic acid has been used the liquor may be further treated with caustic lime and be again employed to treat a fresh lot of raw material.

We wish to point out that the treatment of the zincate liquor to throw down the lead may take place at any stage of our process prior to the final throwing down of the zinc oxid or hydroxid; but we prefer it to take place early, as above described.

The various by-products accruing during the carrying out of our invention may be utilized as seems best.

What we claim as our invention, and desire to secure by Letters Patent, is—

1. The process of extracting zinc from substances containing the same consisting in subjecting the raw material to the action of a solution of a caustic alkali, precipitating any lead present by galvanic action, securing the removal of organic matters and iron, manganese and silicon by the addition of caustic lime and bleaching-powder, and finally precipitating the dissolved zinc in the form of zinc oxid or zinc hydroxid by decaustifying the solution by the addition of an acid, substantially as described.

2. The process of extracting zinc from substances containing the same consisting in subjecting the raw material to the action of a solution of a caustic alkali, precipitating any lead present by galvanic action, securing the removal of organic matters and iron manganese and silicon by the addition of caustic lime and bleaching-powder, and finally precipitating the dissolved zinc in the form of zinc oxid or zinc hydroxid by adding carbonic acid, substantially as described.

3. The process of extracting zinc from substances containing the same, consisting in subjecting the substances to the action of a caustic alkali, the various steps of the dissolving being so carried out that the solution of caustic alkali is brought in contact with several successive portions of raw material, and the various portions of raw material are each successively treated with different portions of caustic solution, precipitating any lead present by galvanic action, securing the removal of organic matters and iron manganese and silicon by the addition of caustic lime and bleaching-powder, and finally precipitating the dissolved zinc in the form of zinc oxid or zinc hydroxid by the addition of an acid, substantially as described.

4. The process of extracting zinc from substances containing the same consisting in subjecting the substances to the action of a caustic alkali the various steps of the dissolving being so carried out that the solution of caustic alkali is brought in contact with several successive portions of raw material, and the various portions of raw material are each successively treated with different portions of caustic solution, precipitating any lead present by galvanic action, securing the removal of organic matters and iron manganese and silicon by the addition of caustic lime and bleaching-powder, and finally precipitating the dissolved zinc in the form of zinc oxid or zinc hydroxid by the addition of carbonic acid, substantially as described.

In testimony whereof we have signed our names to this specification in the presence of two subscribing witnesses.

THOMAS RYAN, JUNIOR.
NEWTON HUGHES.

Witnesses:
HENRY G. COVENTRY,
WILLIAM J. BARBER.